United States Patent [19]

Crudup

[11] Patent Number: 5,057,058

[45] Date of Patent: Oct. 15, 1991

[54] SPLIT PULLEY

[76] Inventor: Jack M. Crudup, 1008 Acorn Ct., Arlington, Tex. 76012

[21] Appl. No.: 580,325

[22] Filed: Sep. 10, 1990

[51] Int. Cl.⁵ .............................................. F16H 55/12
[52] U.S. Cl. ........................................ 474/95; 74/450
[58] Field of Search ................... 474/95-99; 74/439, 450

[56] References Cited

U.S. PATENT DOCUMENTS

| | | | |
|---|---|---|---|
| 1,643,611 | 9/1927 | Rouanet | 474/98 |
| 1,887,279 | 11/1932 | Bendit | 474/98 |
| 3,159,047 | 9/1962 | Dable | 74/450 |
| 4,402,390 | 9/1983 | Feeney | 474/96 X |
| 4,506,559 | 3/1985 | Franck et al. | 74/450 X |
| 4,631,974 | 12/1986 | Wiegand et al. | 74/450 |

FOREIGN PATENT DOCUMENTS 0004685 of 1901 United Kingdom .

*Primary Examiner*—Thuy M. Bui
*Attorney, Agent, or Firm*—Ned L. Conley; David A. Rose; Jeffrey W. Tayon

[57] ABSTRACT

A split pulley made of a resilient material which is held together by a circumferentially extending strap carried wholly within the body of the pulley.

7 Claims, 2 Drawing Sheets

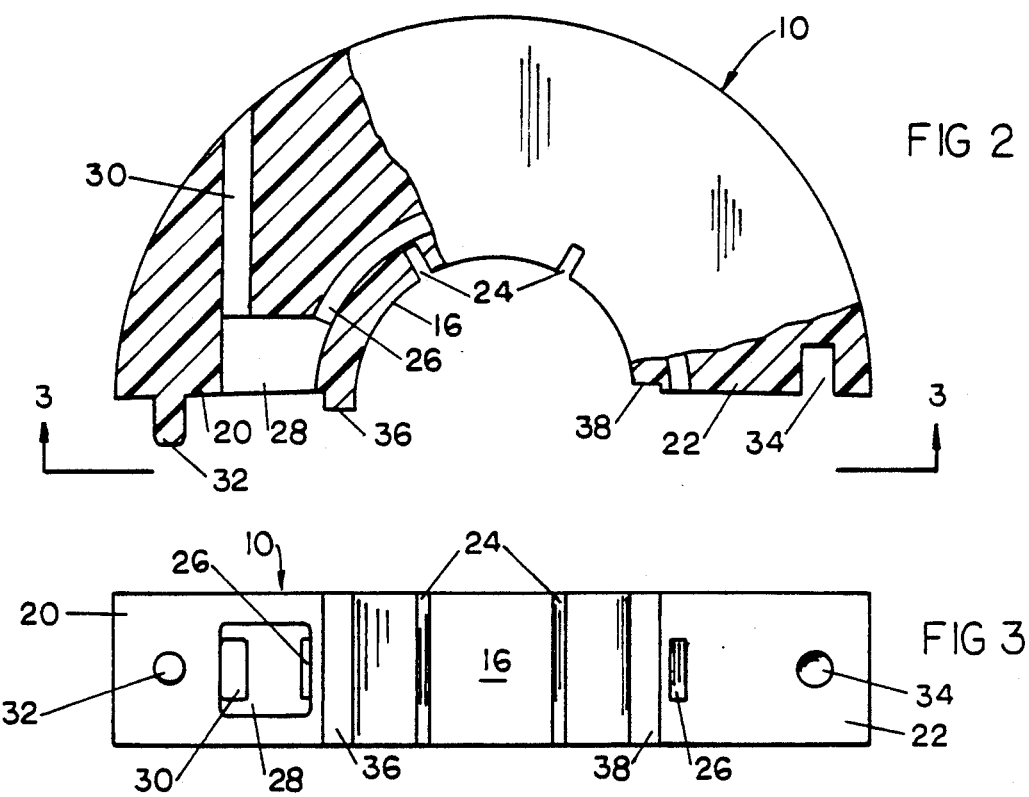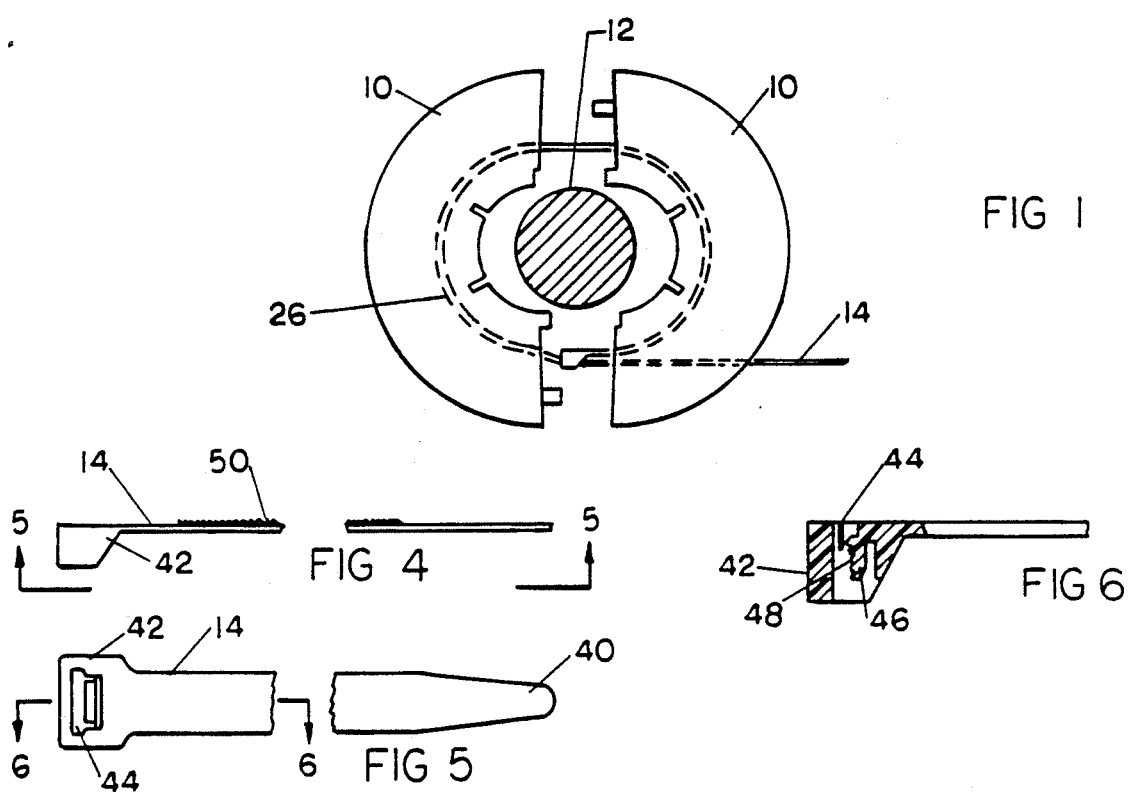

SPLIT PULLEY

FIELD OF THE INVENTION

This invention relates to a pulley for mounting on a shaft. More particularly, the invention relates to such a pulley which is split, i.e. formed in two or more segments so that it can be mounted on or removed from the shaft without removing the shaft from its installation or disturbing the bearings which support the shaft. The term "pulley" as used herein is intended to include sheaves, sprockets, gears, rollers, collars and other generally cylindrical devices intended to be mounted on a solid or tubular shaft or other centrally disposed body, all of which are intended to be included in the term "shaft" as used herein.

BACKGROUND OF THE INVENTION

Conventional pulleys are made of various materials, including polymeric materials and metals such as iron or steel, many of which are affixed to the shaft by various means such as a key or key way to cause the pulley and shaft to rotate together. To avoid having to remove the shaft and bearings when it was necessary to replace a pulley, it has long been known to utilize a split pulley. Such a pulley is shown, for example, in British Patent No. 4685 issued Mar. 5, 1901 to John Lumsden. To decrease manufacturing costs, prior art pulleys have been made of plastics as disclosed in U.S. Pat. No. 4,506,559, issued Mar. 26, 1985 to Francke, et al. The prior art teaches a variety of means to hold split pulleys together. For example, U.S. Pat. No. 438,822 patented Oct. 21, 1890 by G. Philion discloses the use of a pair of hoops to hold his split wooden pulley together and G.F. Dable, in his U.S. Pat. No. 3,159,047 issued December 1, 1964 uses a pair of split flexible spring steel rings. Wiegand, et al, in their U.S. Pat. No. 4,631,974 use two or more circular band clamps around the hubs of a sprocket, together with a pair of wedge dog clamps, to hold a split sprocket together.

Despite the availability of a large variety of pulley constructions, there are still many applications for which no suitable pulley configuration has been found. For example, in many mining operations, such as coal mining, mined material is transported on a conveyor belt which may be hundreds of feet long. The return side of the conveyor belt tends to droop and sag, so it is necessary to provide means to support it. It has been the practice to support such belts on a series of pulleys mounted on shafts which extend transversely of the conveyor belt. These shafts are mounted on pillow block bearings, so that the pulleys and shaft are rotated by the moving belt resting on the pulleys. Since such belts may be from four to twelve feet wide, there may be five to fifteen pulleys mounted on a single shaft, and shafts may be spaced as closely as ten feet apart for a distance of hundreds of feet.

The environment surrounding such conveyors is often laden with abrasive particles, and to retard the effect of such particles on the pulleys, they are often made of an abrasion resistant material such as rubber, which may be reinforced by an embedded steel ring. The pulleys are installed on the shaft by driving them on one end until they are spaced as desired along the shaft. Such pulleys have a bore which is an interference fit on the shaft, and include axially extending slots spaced around the bore, which allow the bore to be spread to facilitate installation. The shaft is then installed in the bearings.

Despite the use of abrasion resistant materials, these pulleys wear fairly rapidly, and must be replaced. Since they are normally mounted fifty feet or more above the ground, replacement is a major, labor-intensive operation. As a result, the usual replacement operation consists of assembling pulleys and bearings on the shafts on the ground, using a crane to lift the assembly to the installation location, removing and discarding the old assembly, and then installing the new assembly.

SUMMARY OF THE INVENTION

It is an object of this invention to provide a pulley which is easily installed in a desired location along a shaft in a few minutes, using only hand tools, and just as easily removed and replaced.

It is another object of this invention to provide a pulley which is highly resistant to environmental contaminants, such as abrasive and corrosive materials.

Still another object is to provide a pulley construction which has a wide variety of applications, and which is low in cost.

The pulley of this invention comprises a pair of pulley segments made of a resilient polymeric material, with the segments being held together around a shaft by means of a flexible strap carried wholly within the body of the pulley. The pulley of this invention is characterized by its low cost, ease of installation and of replacement and by the fact that it is highly resistant to abrasive and corrosive atmospheres. Moreover, the clamping means is protected against accidental damage which ma release the pulley.

BRIEF DESCRIPTION OF THE DRAWING

FIG. 1 of the drawing shows a preferred embodiment of the pulley is invention being assembled around a shaft;

FIG. 2 shows an elevational view of one of the segments of the embodiment of FIG. 1, with parts being in section;

FIG. 3 is a view of the pulley segment shown in FIG. 2, taken at line 3—3 of FIG. 2;

FIG. 4 is an elevational view of a flexible strap according to one embodiment of this invention;

FIG. 5 is a view of the strap of FIG. 4, taken at 5—5 of FIG. 4;

FIG. 6 is an enlarged sectional view of a portion of the strap shown in FIG. 4;

DESCRIPTION OF THE PREFERRED EMBODIMENTS

Figure 7:
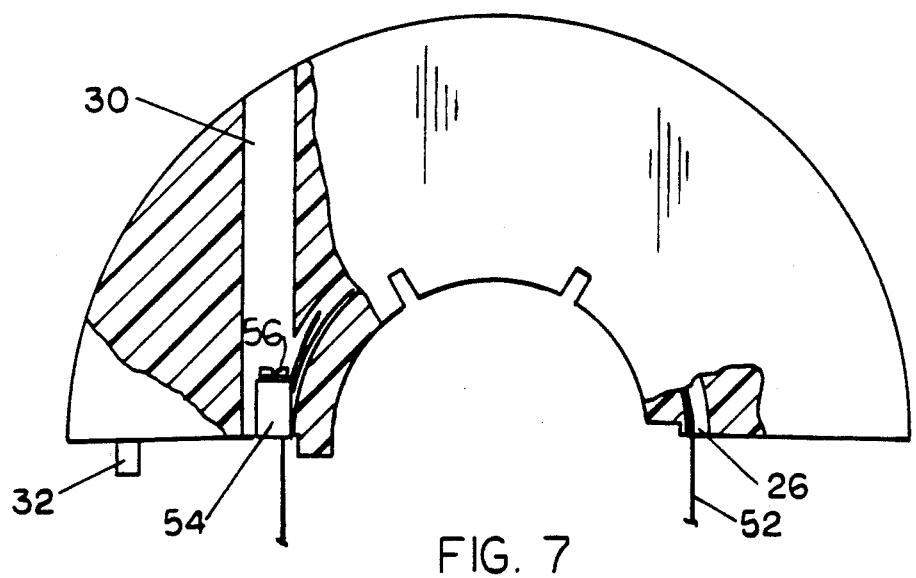
FIG. 7 is an elevational view of another embodiment of the pulley of this invention, showing a different kind of strap.

FIG. 1 of the drawing shows two pulley segments 10, 10 being fitted around a shaft 12 with a strap 14 passing through the two halves of the pulley body. In the embodiment shown, the pulley segments are not identical, but identical segments could be used. These segments are shown in better detail in FIGS. 2 and 3. As shown, each pulley segment is approximately semi-cylindrical in shape with a concentric semi-cylindrical bore 16. The split line between the two segments is identified by the mating faces 20 and 22 of each of the two pulley segments. As molded, the semi-cylindrical bore preferably has a radius approximately the same as the radius of the shaft on which the pulley is to be used, although for some applications it may be desirable for the bore to be slightly smaller or slightly larger than the shaft. In the preferred embodiment, the two faces 20 and 22, as molded, are not aligned, but instead, at the bore each pulley segment extends somewhat less than 180°, to leave a gap of one-sixteenth to three-sixteenths inch between mating faces 20, 22 at their inner edges, for a purpose which will hereinafter be explained.

Each semi-cylindrical bore 16 is provided with two or more axially extending slots 24 extending radially outwardly, to near an annular concentric passageway 26 which provides communication between radial faces 20 and 22 of each pulley segment. When the pulley is assembled, this concentric passageway is wholly within the body of the pulley. Face 20 also includes a recess 28 intersected by one end of the passageway 26 and a passageway 30 which intersects the recess 28 and extends substantially tangentially to the passageway 26 and intersects the circumference of the pulley segment.

Faces 20 and 22 are provided with a cooperating pin 32 and socket 34, dimensioned so that the pin of one pulley segment will fit in the socket of the other pulley segment to align the two pulley segments, and to prevent relative lateral movement of the segments when they are installed on the shaft. In addition, faces 20 and 22 are provided with a cooperating projection 36 and notch 38 at the ends of the semi-cylindrical bore 16 to provide further means for alignment of the two pulley segments.

The strap depicted in FIGS. 4, 5 and 6 is a conventional cable tie such as that sold under the trademark TY-RAP by Thomas and Betts, and comprises a narrow, thin strip of flexible polymeric material such as nylon, which has a relatively high strength. A breaking strength of 250 pounds is usually sufficient for most applications. The strap has a narrowed tongue 40 at its free end to facilitate threading it through the passageway 26 and an enlarged head 42 at the other end. Head 42 has a passageway therethrough large enough to allow the free end of the strap to pass through it. One side of the passageway 44 is formed as a flexible pawl extending longitudinally of the passageway and having a row of pawl teeth 48 parallel to the passageway and angled toward the elongate portion of the strap 14. The upper face of the strap, as shown in FIG. 4, has formed along a substantial portion of its length a row of ratchet teeth 50 dimensioned and faced to cooperate with the teeth of the pawl 48 so that when the tongue of the strap is passed through the opening 44 and then the strap is pulled through the opening until the teeth on the strap can engage the teeth on the pawl, the pawl prevents the strap from being pulled back out of the opening 44.

The two segments of the pulley may be identical, with each segment containing a recess 28, and one pin 32 and one cavity 34 on each segment, so that only one mold is required to make them. Alternatively, both of the pins 32 may be on one segment of the pulley and both of the cavities 34 on the other segment, and other variations may be included so that the segments are not interchangeable.

The pulley segments of this invention are preferably made of a flexible polymeric material, such as polyurethane, nylon, polypropylene, polyester or natural or synthetic rubber. The segments may also be made of combinations of such materials, of the same or different hardnesses. The molded segments may also include reinforcing materials, and may include a bonded metal rim, which may have belt grooves, gear teeth or other adaptations. The material selected preferably should have a relatively high coefficient of friction with the material to be used for the shaft if the pulley is to be non-rotatable with respect to the shaft, and should be resistant to the environment in which the pulley is to be used. It is important that the pulley be flexible enough that it can be tightened around the shaft by the strap means of this invention.

Figure 8:
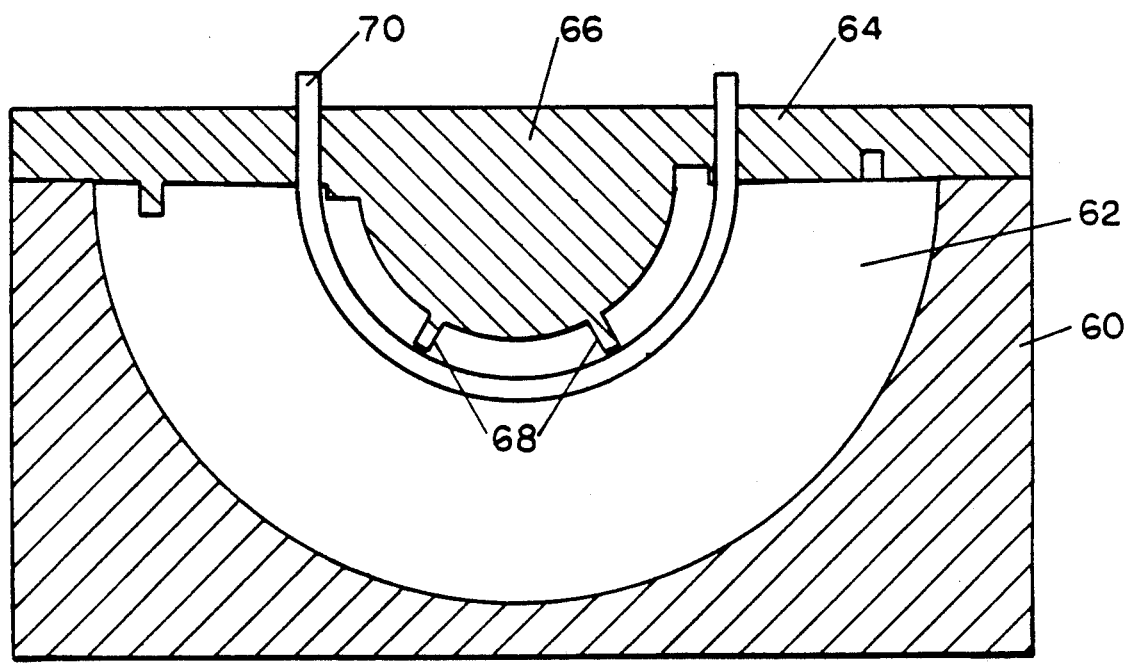
FIG. 8 is a sectional view of one form of mold which may be used to mold a segment of a pulley according to this invention.

Pulley segments may be molded in a mold such as exemplified in FIG. 8, in which the mold body 60 has a cavity 62 to receive the polymeric material. The mold cover 64 has a core portion 66 which forms the bore 16 of the segment, and ribs 68 which form the slots 24. The concentric passageway 26 is formed by a strap 70, which is a flexible, preferably hollow, strap which may be pulled from the segment after it is molded. The strap 70 is supported on the ribs 68, but the connection between them is not liquid tight, so that when the segment is molded there will usually be a thin wall between the slots 24 and the concentric passageway 26. Alternatively, the strap may be supported on small pins extending from the ribs 68, so that the passageway 26 is formed radially outwardly from the slots 24.

The embodiment of the invention shown in FIG. 7 is identical to that of FIGS. 1 through 6 except that instead of the flexible high strength polymeric strap, a strap such as an ordinary hose clamp is used. Such straps are well known in the art in several forms, and need not be described in detail. One such strap is disclosed in U.S. Pat. No. 4,631,974, and another form, commonly known as a worm drive hose clamp, is available from Tridon, Inc., of Nashville, Tenn. This form of strap, illustrated in FIG. 7, may consist of a flexible metallic strap 52, made of a spring steel or stainless steel, which passes through the passageway 26, the strap being provided with transverse slots or notches as well known in the art, to receive a screw thread, known as a worm, carried within the head or screw housing 54, which is tightened by means of a screwdriver applied to the screw head 56 through passageway 30.

When the split pulley of the embodiment of FIGS. 1–6 is to be installed on a shaft 12, a strap 14 is threaded into one segment of the pulley as shown in FIG. 1, the two pulley segments are placed on opposite sides of the shaft 12 and then the free end 40 of the strap is threaded through the passageway 26 of the other pulley segment and then through the passageway 44 in the head of the strap and finally through the passageway 30 in one of the pulley segments. Using pliers, or a clamping device designed for this purpose, the strap can then be pulled tight to pull the two halves of the pulley together with the pins 32 mating with their corresponding cavities 34 to properly align the pulley segments. The cooperating pawl and ratchet teeth on the strap and in the head engage each other and allow the free end of the strap to be pulled through the head passageway to pull the two pulley segments together, but prevent movement of the strap in the other direction. As the force on the strap increases, the head 42 of the strap is pulled into the recess 28, and the outer edges of the mating faces 20, 22 contact each other. Further tightening of the strap will begin to deform the segments, pulling the mating faces together and pulling the bore 16 tightly around the shaft, the slots 24 allowing the bore to be deformed as necessary to fit the pulley tightly around the shaft. The outer edges of the pulley segment faces will therefore be pulled tightly together to insure a continuous circumferential surface. When the strap has been pulled to the desired tightness, while tension is still on it, it can be cut off flush with the surface of the pulley segment. Contraction of the strap will pull the cut end back within the passageway 30. Because the strap is located adjacent to the bore of the pulley segments, there is a relatively thin wall between the strap and the bore so that the pulley segments may be readily deformed to insure that the segments securely grip the shaft.

It will be appreciated that if a highly accurate external circle is required, it will be necessary to compensate in the molding of the segments for the distortion resulting from tightening the segments on the shaft.

In some installations it may be desirable for the bore 16 to be loose on the shaft. When this is the case, the bore should be made larger, and tightening of the strap will not cause the segments to grip the shaft.

Pulley segments made according to the embodiment of FIG. 7 are assembled in a similar manner, except that the loose end of the strap 52 is fed into the screw housing 54 and then out into the passageway 26 again, and then a screwdriver is inserted through the passageway 30 to operate the screw to tighten the clamp around the two pulley segments and pull them into tight engagement with the shaft and with each other.

In the coal conveyor belt application, when it is necessary to replace worn pulleys, it is not necessary to remove the bearings and shafts. The pulley of this invention is easily removed by merely cutting or breaking the strap between the faces of the segments, and removing the segments. The replacement pulley is then installed as described above. Only simple hand tools are required, and removal and replacement of a pulley takes only a few minutes.

The invention has been described in terms of the embodiment required for installation in the coal conveyor belt application described earlier. For other applications, variations within the scope of the invention will be apparent to those skilled in the art. There are many possible applications for the invention, including pipe protectors such as are used on oil well drill pipe, and crossing insulators to insulate pipe lines from a surrounding casing.

Although preferred embodiments of the invention have been shown and described herein, the invention is not limited to these embodiments, but extends to all variations thereof which will be apparent to those skilled in the art. For example, different kinds of straps might be used, so long as they are flexible and of sufficient strength, and can be tightened around the bore of the pulley with sufficient force to tighten the pulley on the shaft.

I claim:

1. A polymeric cylindrical split pulley having a plurality of mating segments with mating faces joined at a split line between the segments and having a concentric bore,
a substantially concentric passageway adjacent but spaced from and encircling said bore and wholly within said pulley,
a flexible adjustable strap within and extending the full length of said concentric passageway, and
means for tightening said strap around said bore to hold the mating segments together.

2. A pulley as defined by claim 1 and including a recess in one of the mating faces of one of the segments, said recess being intersected by said concentric passageway.

3. A pulley as defined by claim 2 and including a passageway in said one of said segments extending substantially tangentially to said concentric passageway from the circumference of the pulley to intersection with said recess.

4. A pulley as defined by claim 3 wherein said strap comprises a cable tie.

5. A pulley as defined by claim 3 wherein the strap comprises a worm drive clamp.

6. A pulley as defined by claim 1, in which the mating faces of the pulley segments in unassembled condition are not aligned, so that when the mating faces of one segment is initially engaged with the mating faces of the other segment, before tightening, there is a gap between the mating faces at either their inner or outer edges, and when assembled into a pulley the segments are deformed by the tightening of the strap to close up the gap.

7. A polymeric cylindrical split pulley having two mating segments with mating faces joined at a split line between the segments and having a concentric bore,
a concentric passageway adjacent but spaced from and encircling said bore and wholly within said pulley,
a plurality of axially extending slots surrounding and extending radially outwardly from said bore toward, but not intersecting, said concentric passageway,
a recess in one of the faces of one of the segments intersected by said concentric passageway,
a passageway in said one of said segments extending substantially tangentially to said concentric passageway from the circumference of the pulley to intersection with said recess,
the mating faces of each pulley segment in unassembled condition being out of alignment so that when the mating faces of the segments are initially engaged, before tightening, there is a gap between them at either their inner or outer edges, and when assembled into a pulley the segments are deformed by the tightening of the strap to close up the gap,
a flexible, adjustable strap within and extending the full length of said concentric passageway, and
means on said strap, located in said recess when the pulley is assembled, operable by force exerted through said tangential passageway to tighten the strap.

* * * * *